US012096530B2

(12) United States Patent
Kanbara et al.

(10) Patent No.: US 12,096,530 B2
(45) Date of Patent: Sep. 17, 2024

(54) POWER CONTROL DEVICE (71) Applicant: Rohm Co., Ltd., Kyoto (JP)

(72) Inventors: Daisuke Kanbara, Kyoto (JP); Akira Aoki, Kyoto (JP); Ryo Takagi, Kyoto (JP)

(73) Assignee: Rohm Co., Ltd.

( * ) Notice: Subject to any disclaimer, the term of this patent is extended or adjusted under 35 U.S.C. 154(b) by 0 days.

(21) Appl. No.: 18/038,281

(22) PCT Filed: Dec. 20, 2021

(86) PCT No.: PCT/JP2021/046956
§ 371 (c)(1),
(2) Date: May 23, 2023

(87) PCT Pub. No.: WO2022/138540
PCT Pub. Date: Jun. 30, 2022

(65) Prior Publication Data
US 2023/0422375 A1    Dec. 28, 2023

(30) Foreign Application Priority Data
Dec. 25, 2020   (JP) .................................. 2020-217755

(51) Int. Cl.
*H05B 45/50*      (2022.01)
*H05B 45/3725*    (2020.01)

(52) U.S. Cl.
CPC ......... *H05B 45/50* (2020.01); *H05B 45/3725* (2020.01)

(58) Field of Classification Search
None
See application file for complete search history.

(56) References Cited

U.S. PATENT DOCUMENTS

| 2015/0061517 A1* | 3/2015 | Fan ..................... H05B 45/3725 315/200 R |
| 2021/0100082 A1* | 4/2021 | Aoki .................... H05B 45/305 |
| 2021/0399637 A1* | 12/2021 | Guan .................... H02M 3/157 |
| 2022/0209764 A1* | 6/2022 | Guan ..................... H02M 1/32 |

FOREIGN PATENT DOCUMENTS

JP    2005206074    8/2005

OTHER PUBLICATIONS

International Search Report for PCT/JP2021/046956 dated Mar. 8, 2022 with English translation (4 pages).

* cited by examiner

*Primary Examiner* — Anh Q Tran
(74) *Attorney, Agent, or Firm* — Fish & Richardson P.C.

(57) ABSTRACT

A power control device is configured to control a power circuit that generates an output voltage based on an input supply voltage relative to a ground, and includes a first terminal fed with a common voltage, a second terminal connectable to an application terminal for the ground, a P-type substrate fed with the common voltage, a MOS transistor connected between the first and second terminals and configured with an N-channel MOSFET, and an internal reference voltage generating circuit configured to generate, based on the input supply voltage, an internal reference voltage relative to the common voltage. When the input supply voltage is turned on, the MOS transistor is turned on and thereby the first and second terminals are short-circuited together.

8 Claims, 8 Drawing Sheets

POWER CONTROL DEVICE

CROSS REFERENCE OF RELATED APPLICATIONS

This application is a U.S. National Phase application under 35 U.S.C. § 371 of International Patent Application No. PCT/JP2021/046956, filed on Dec. 20, 2021, which claims the priority of Japanese Patent Application No. JP2020-217755, filed on Dec. 25, 2020, the disclosure of which is incorporated herein by reference in its entirety.

TECHNICAL FIELD

The present disclosure relates to a power control device.

BACKGROUND ART

Conventionally, various LED driving devices for driving LEDs (light emitting diodes) have been developed (for example, Patent Document 1).

CITATION LIST

Patent Literature

Patent Document 1: Japanese Unexamined Patent Application Publication No. 2005-206074

SUMMARY OF INVENTION

Technical Problem

LED driving devices are often offered as semiconductor devices (IC packages). In this case, an LED driving device incorporates a circuit that generates an internal reference voltage. Inconveniently, with conventional LED driving devices, a phenomenon is known in which the circuit just mentioned does not start up when the LED driving device starts up.

In view of the above circumstances, an object of the present disclosure is to provide a power control device that can start an internal reference voltage generating circuit more reliably when the device starts up.

Solution to Problem

According to one aspect of the present disclosure, a power control device configured to control a power circuit that generates an output voltage based on an input supply voltage relative to a ground includes a first terminal fed with a common voltage, a second terminal connectable to an application terminal for the ground, a P-type substrate fed with the common voltage, a MOS transistor connected between the first and second terminals and configured with an N-channel MOSFET, and an internal reference voltage generating circuit configured to generate, based on the input supply voltage, an internal reference voltage relative to the common voltage. When the input supply voltage is turned on, the MOS transistor is turned on and thereby the first and second terminals are short-circuited together.

Advantageous Effects of Invention

With a power control device according to the present disclosure, it is possible to start the internal reference voltage generating circuit more reliably when the device starts up.

DESCRIPTION OF EMBODIMENTS

Hereinafter, an illustrative embodiment of the present disclosure will be described with reference to the drawings.

1. Negative Buck-Boost DC/DC Converter

Figure 1:
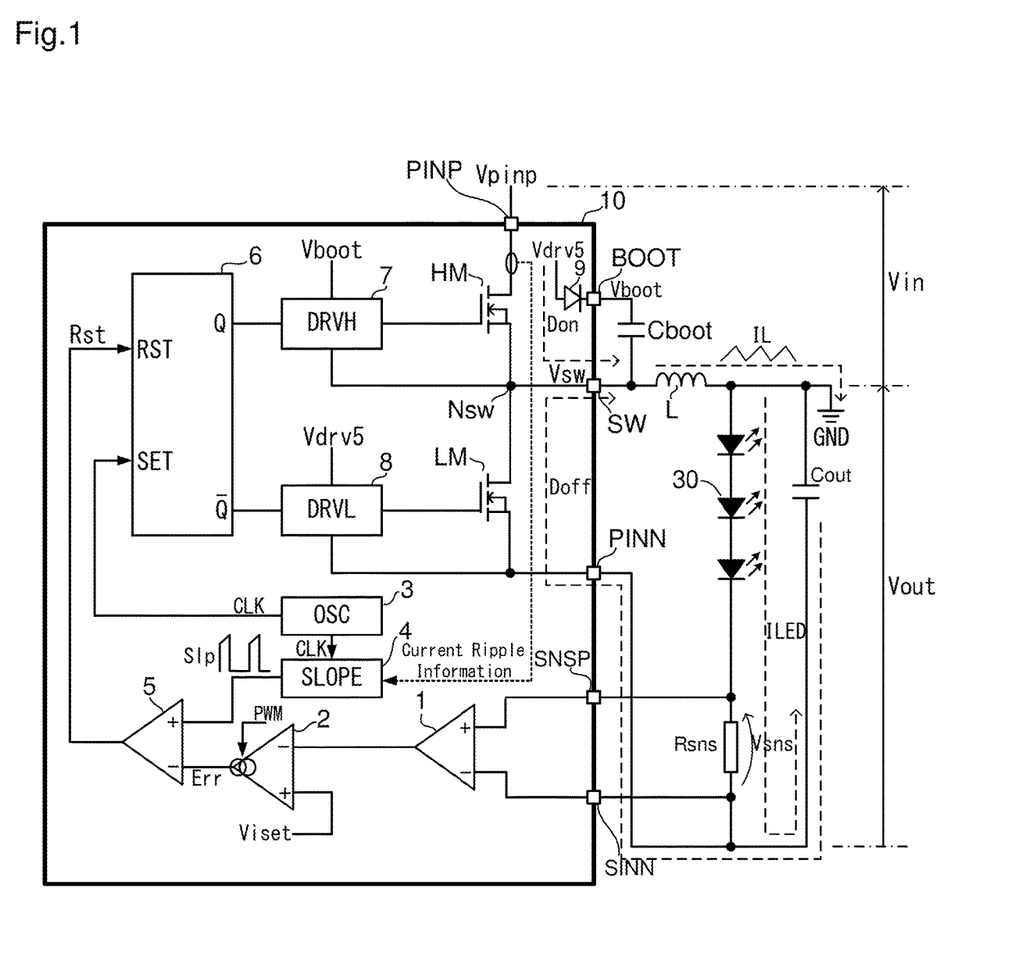
FIG. 1 is a diagram showing a configuration relating to a DC/DC converter function in an LED driving device according to the present disclosure.

FIG. 1 is a diagram showing a configuration relating to a DC/DC converter function in an LED driving device 10 according to the illustrative embodiment of the present disclosure. The LED driving device 10 is a semiconductor device (IC package) for driving LEDs 30 and has a negative buck-boost DC/DC converter function. The LED driving device 10 is, for example, a device for an exterior lamp (such as a headlamp, a rear lamp, or a turn lamp) on a two/four-wheel vehicle.

One intention of using the negative buck-boost function in the LED driving device is to cope with both a situation where a drop in the battery voltage or the like causes a drop in the input supply voltage Vpinp such that Vpinp is lower than the forward voltage Vf of the LED 30 and a situation where the number of LEDs 30 lit is such that Vpinp is higher than Vf of the LED 30. Another intention of using the negative buck-boost configuration is to eliminate the need for a protection circuit in case of the anode of the LED 30 short-circuiting to an application terminal for Vpinp.

As shown in FIG. 1, the LED driving device 10 includes, integrated in one chip, an amplifier 1, an error amplifier 2, an oscillator 3, a slope generator 4, a comparator 5, a flip-flop 6, a high-side driver 7, a low-side driver 8, a diode 9, a high-side transistor HM, and a low-side transistor LM.

The LED driving device 10 has, as external terminals for establishing electrical connection with the outside, a PINP terminal (input power terminal), a BOOT terminal (bootstrap capacitor connection terminal), an SW terminal (switching output terminal), a PINN terminal (DC/DC negative reference input terminal), an SNSP terminal (LED current sense positive connection terminal), and a SINN (small-signal negative reference input terminal).

Outside the LED driving device 10, an inductor L, an output capacitor Cout, LEDs a sense resistor Rsns, and a boot capacitor Cboot are provided.

The DC/DC converter includes the high-side transistor HM, the low-side transistor LM, the inductor L, and the output condenser Cout, and generates an output voltage Vout based on an input voltage Vin through switching control by the LED driving device 10. The output voltage Vout is applied to the LEDs 30 as a load.

One terminal of the inductor L is connected to the SW terminal. The other terminal of the inductor L is connected to the anode of the LEDs 30 and to one terminal of the output capacitor Cout, and is grounded by being connected to an application terminal for a ground GND. The ground GND is the reference potential in an application.

The cathode of the LEDs 30 is connected to one terminal of the sense resistor Rsns. The other terminal of the sense resistor Rsns and the other terminal of the output capacitor Cout are connected to the PINN terminal.

To the PINP terminal, the application terminal for the input supply voltage Vpinp is connected. The input supply voltage Vpinp is, for example, 12 V with respect to the ground GND.

The high- and low-side transistors HM and LM are both configured as N-channel MOSFETs (metal-oxide-semiconductor field-effect transistors), and are connected in series between the PINP and PINN terminals to form a bridge. More specifically, the drain of the high-side transistor HM is connected to the PINP terminal. The source of the high-side transistor HM and the drain of the low-side transistor LM are connected together at a node Nsw. The source of the low-side transistor LM is connected to the PINN terminal. The node Nsw is connected at the SW terminal.

One terminal of the sense resistor Rsns is connected to the SNSP terminal. The other terminal of the sense resistor Rsns is connected to the SINN terminal.

One input terminal of the amplifier 1 is connected to the SNSP terminal. The other input terminal of the amplifier 1 is connected to the SINN terminal. The current flowing through the LEDs 30 is converted by the sense resistor Rsns into a sense voltage Vsns which appears across the sense resistor Rsns. The amplifier 1 amplifies the sense voltage Vsns fed to it at a predetermined gain. For example, the amplifier 1 amplifies the sense voltage Vsns by multiplying it 12.5 times.

The output of the amplifier 1 is fed to one input terminal of the error amplifier 2. The other input terminal of the error amplifier 2, is fed with a setting voltage Viset. The error amplifier 2 amplifies an error between the signals fed to its two input terminals to generate an error signal Err.

Here, the LED driving device 10 has a PWM dimming function. PWM dimming is a method of dimming achieved by switching the LED on and off at several hundred hertz to several kilohertz wherein the brightness of the LED is determined by the duty of a PWM dimming signal ("PWM" in FIG. 1) in one cycle of it. When the PWM dimming signal is at high level, the error amplifier 2 performs its normal operation, and when the PWM dimming signal is at low level, the error amplifier 2 suspends its normal operation and performs output keeping operation. In this way, when the PWM dimming signal turns to high level, the error amplifier 2 can start to operate with the output of the error amplifier 2 as it was immediately before the PWM dimming signal fell to low level. In this way, it is possible to suppress variation in the LED current as much as possible.

The oscillator 3 generates a clock signal CLK of the fixed frequency (for example, 400 kHz). The slope generator 4 generates a slope signal Slp of the fixed frequency mentioned above based on the clock signal CLK. The slope signal Slp is generated based on current ripple information on the current flowing through the high-side transistor HM.

The non-inverting input terminal (+) of the comparator 5 is fed with the slope signal Slp. The inverting input terminal (−) of the comparator 5 is fed with the error signal Err. The output of the comparator 5 is fed to the reset terminal of the flip-flop 6. The set terminal of the flip-flop 6 is fed with the clock signal CLK.

The high-side driver 7 drives the gate of the high-side transistor HM based on the output from the Q terminal of the flip-flop 6 to drive the switching of the high-side transistor HM. The high-side driver 7 feeds the gate of the high-side driver 7 with a voltage between a boot voltage Vboot and the switching voltage Vs w at the SW terminal.

The boot capacitor Cboot for bootstrapping is connected between the BOOT terminal and the SW terminal. The anode of the diode 9 is connected to the application terminal for an internal reference voltage Vdrv5, which will be described later. The cathode of the diode 9 is connected to the BOOT terminal. As the boot capacitor Cboot is charged, the boot voltage Vboot appears at the BOOT terminal. The boot voltage Vboot permits the high-side transistor HM to be turned on.

The low-side driver 8 drives the gate of the low-side transistor LM based on the output from the Q-bar terminal of the flip-flop 6 to drive the switching of the low-side transistor LM. The low-side driver 8 feeds the gate of the low-side driver 8 with a voltage between the internal reference voltage Vdrv5 and the voltage at the PINN terminal.

With this configuration, the LED driving device 10 can supply a stable current to the LEDs 30 against variation in the input supply voltage Vpinp and in the LED load through feedback control on the LED average current ILED flowing through the LEDs 30.

Figure 2:
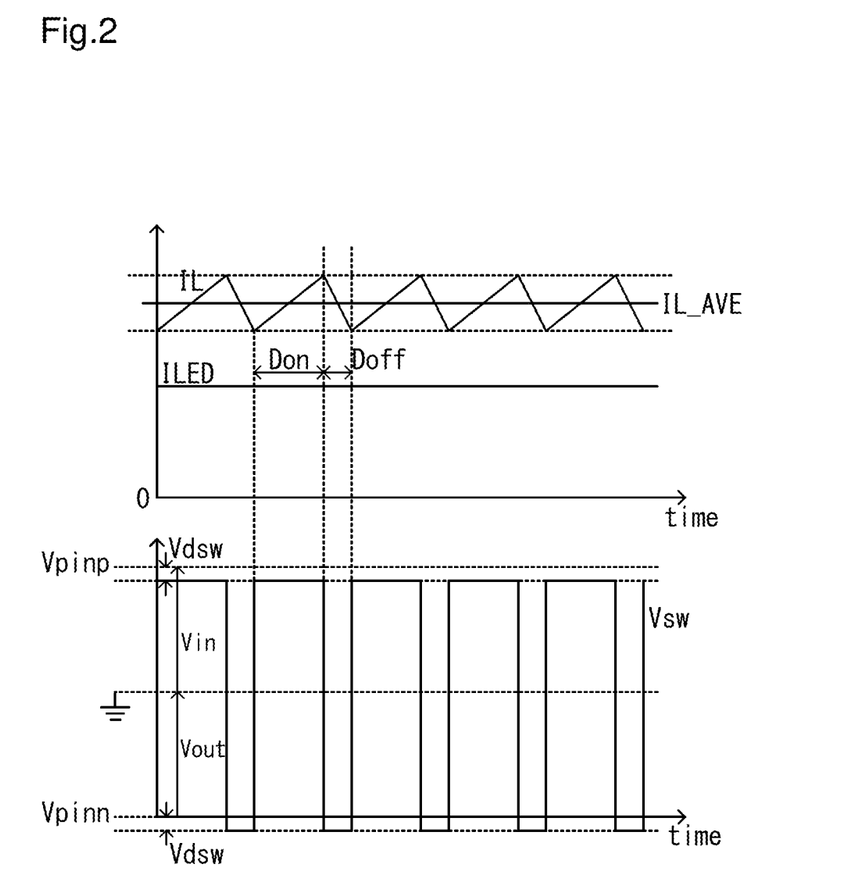
FIG. 2 is a diagram showing an example of the waveforms of an inductor current, an inductor average current, an LED average current, and a switching voltage.

Here, FIG. 2 shows an example of the waveforms of the inductor current IL flowing through the inductor L, the inductor average current IL_AVE, the LED average current ILED, and the switching voltage Vsw. The voltage drop Vdsw shown in FIG. 2 is a voltage drop due to the on resistance of the high- or low-side transistors HM or LM. When, by the clock signal CLK, the flip-flop 6 is set, the high-side transistor HM is turned on, and the low-side transistor LM is turned off, an on-period Don (see FIG. 2) is started. In the on-period Don, a current flows via the high-side transistor HM in the ON state and the SW terminal (the current path indicated by "Don" in FIG. 1), and the inductor current IL increases. Meanwhile, the inductor L stores excitation energy.

When, by the output of the comparator 5, the flip-flop 6 is reset, the high-side transistor HM is turned off, and the low-side transistor LM is turned on, an off-period Doff (see FIG. 2) is started. In the off-period Doff, the excitation energy stored in the inductor L causes a current to flow via the low-side transistor LM in the ON state and the SW terminal (the current path indicated with "Doff" in FIG. 1), and the inductor current IL decreases. Meanwhile, with the other terminal of the inductor L grounded by being connected to the application terminal for the ground GND, the output capacitor Cout is charged negatively. Thus, a negative reference voltage appears at the PINN and SINN terminals.

The negative voltage at the SINN terminal (a first terminal) is one example of a common voltage.

When, by the fixed frequency of the clock signal CLK, the flip-flop 6 is set again, the high-side transistor HM is turned on and the on-period Don is started again.

So that the LED average current ILED may remain equal to a target setting current, inductor peak current control is performed by the turning off of the high-side transistor HM and the inductor average current IL_AVE is controlled.

As shown in FIG. 1, the input voltage Vin between the ground GND and the input supply voltage Vpinp is boosted or bucked to the output voltage Vout between the negative reference voltage and the ground GND. That is, the LED driving device 10 is a power control device that controls a power circuit that generates an output voltage Vout based on an input supply voltage Vpinp relative to a ground GND.

2. Internal Reference Voltage Generating Circuit

Figure 3:
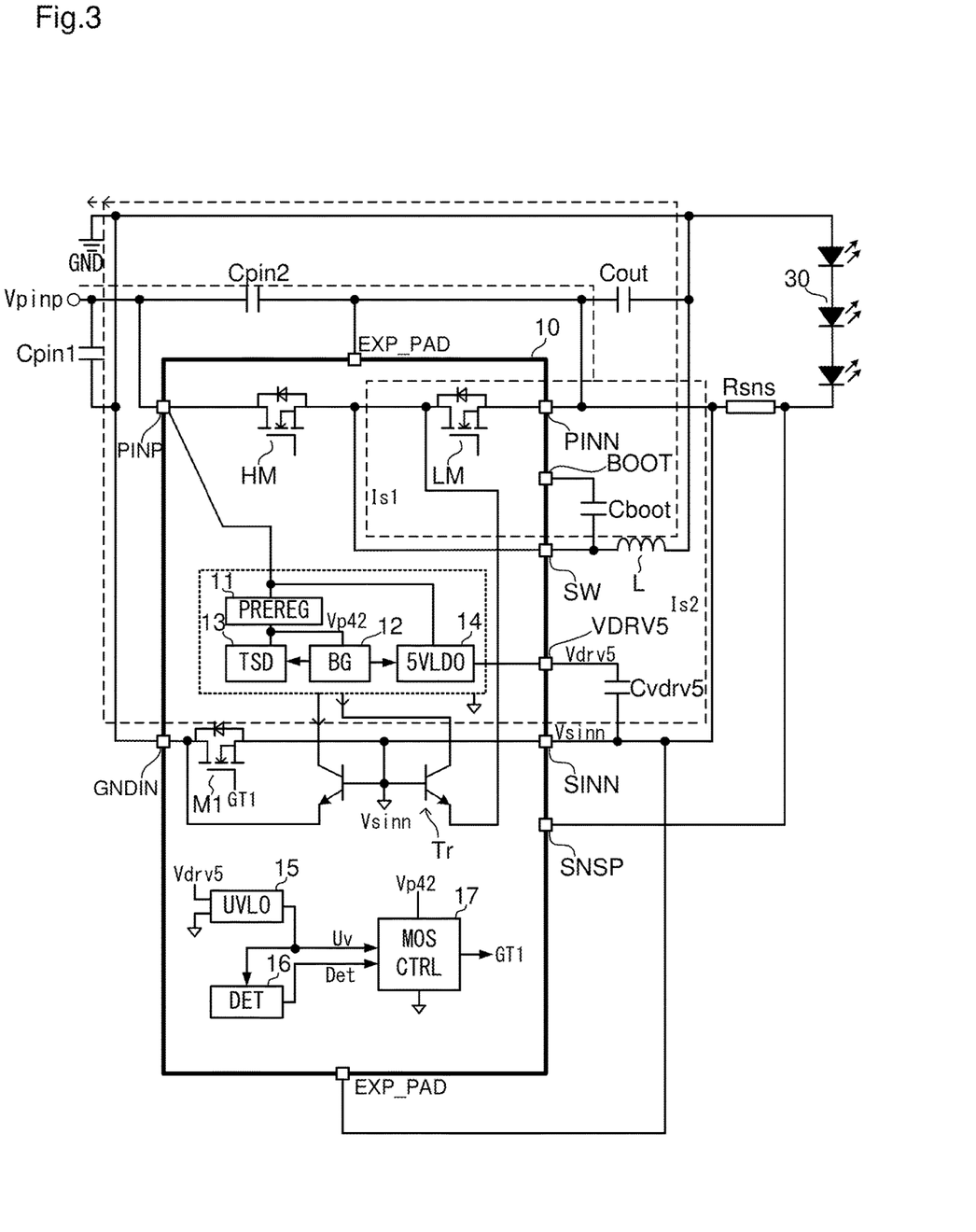
FIG. 3 is a diagram showing an internal configuration of an LED driving device according to an illustrative embodiment of the present disclosure.

Next, an internal reference voltage generating circuit built into an LED driving device will be described. FIG. 3 is a diagram showing an internal configuration of an LED driving device 10 according to an illustrative embodiment of the present disclosure. FIG. 3 is a diagram showing in a concise manner a configuration relating to an internal reference voltage generating circuit 14, a circuit peripheral to it, and a MOS transistor M1, which will be described later. As described above, the LED driving device 10 has a negative buck-boost DC/DC converter function and has in that respect a similar configuration as in FIG. 1.

As shown in FIG. 3, the LED driving device 10 has, in addition to the external terminals shown in FIG. 1, a VDRV5 terminal, a GNDIN terminal, and a heat dissipation pad (EXP_PAD).

As shown in FIG. 3, the LED driving device 10 has an internal power circuit 11, a band gap reference 12, a TSD (overheat protection) circuit 13, and the internal reference voltage generating circuit 14.

The internal power circuit 11 generates an internal supply voltage Vp42 relative to a negative reference voltage Vsinn (a negative reference voltage appearing at the SINN terminal) based on the input supply voltage Vpinp (for example, 12 V relative to the ground GND) fed in via the PINP terminal. Here, as one example, the internal supply voltage Vp42 is 4.2 V relative to the negative reference voltage Vsinn.

Figure 4:
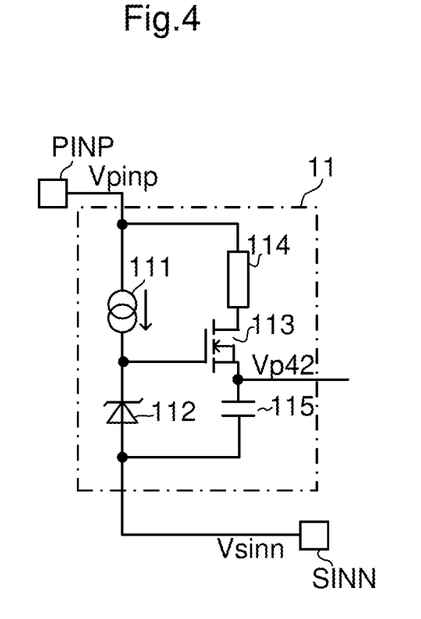
FIG. 4 is a diagram showing a configuration example of an internal power circuit.

FIG. 4 shows a configuration example of the internal power circuit 11. In the configuration shown in FIG. 4, the internal power circuit 11 has a constant-current source 111, a Zener diode 112, an NMOS transistor 113, a resistor 114, and a capacitor 115. The anode of the Zener diode 112 is connected to the SINN terminal. The constant-current source 111 is provided between the PINP terminal and the cathode of the Zener diode 112. One terminal of the resistor 114 is connected to the PINP terminal. The other terminal of the resistor 114 is connected to the drain of the NMOS transistor 113. The gate of the NMOS transistor 113 is connected to the cathode of the Zener diode 112. The capacitor 115 is connected between the source of the NMOS transistor 113 and the anode of the Zener diode 112. In this way, the Zener diode 112 with a Zener voltage of 5 V is provided on the power source side with respect to the negative reference voltage Vsinn; thus, based on the 5 V clamped by the Zener diode 112, an internal supply voltage Vp42 of Vp42=5 V−Vgs=5 V−0.8 V=4.2 V is generated at the source of the NMOS transistor 113.

The band gap reference 12 generates a reference voltage using the internal supply voltage Vp42 as a power source. The reference voltage is, for example, 1.2 V relative to the negative reference voltage Vsinn.

The TSD circuit 13 performs overheating protection operation by using the internal supply voltage Vp42 as a power source.

The internal reference voltage generating circuit 14 is configured as an LDO (low dropout) and generates an internal reference voltage Vdrv5 relative to the negative reference voltage Vsinn based on the input supply voltage Vpinp fed in via the PINP terminal. Here, as one example, the internal reference voltage Vdrv5 is 5.0 V relative to the negative reference voltage Vsinn. The internal reference voltage generating circuit 14 generates the internal reference voltage Vdrv5 based on the reference voltage generated by the band gap reference 12.

Figure 5:
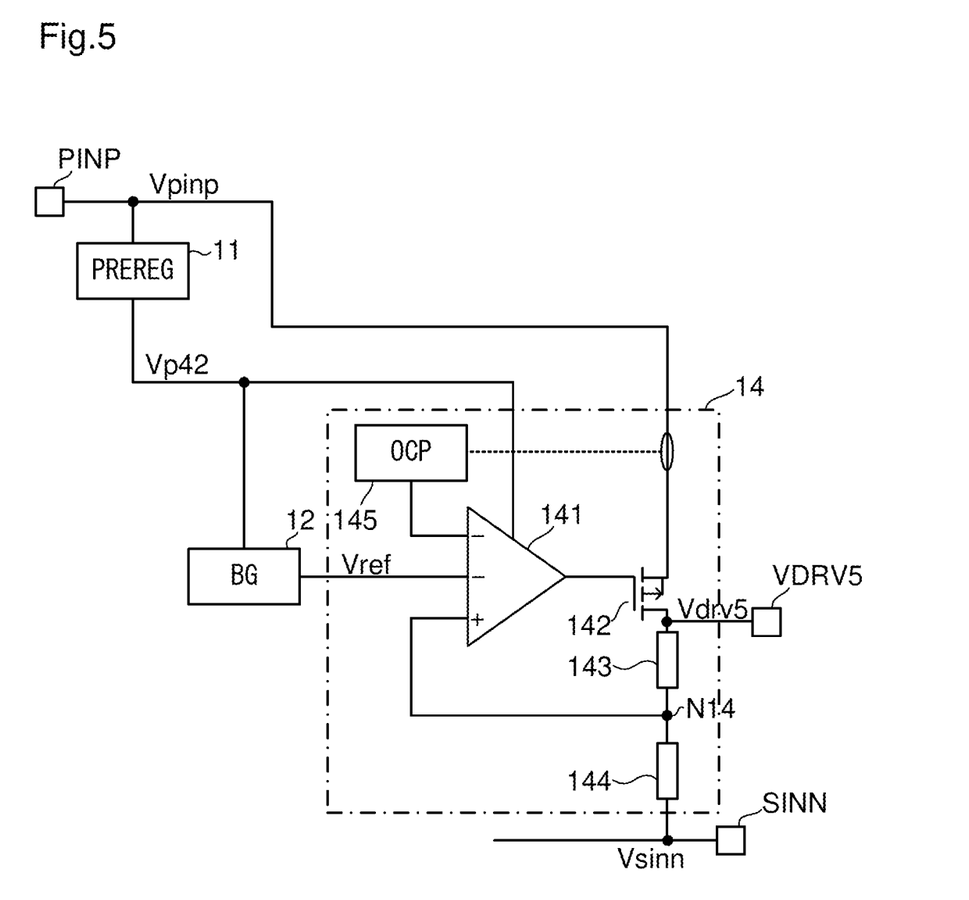
FIG. 5 is a diagram showing a configuration example of an internal reference voltage generating circuit.

FIG. 5 shows a configuration example of the internal reference voltage generating circuit 14. In the configuration shown in FIG. 5, the internal reference voltage generating circuit 14 has an error amplifier 141, a PMOS transistor 142, resistors 143 and 144, and an OCP (overcurrent protection) circuit 145 The inverting input terminal (−) of the error amplifier 141 is fed with a reference voltage Vref output from the band gap reference 12. One non-inverting input terminal (+) of the error amplifier 141 is fed with the output of the OCP circuit 145. The source of the PMOS transistor 142 is connected to the PINP terminal. The gate of the PMOS transistor 142 is connected to the output terminal of the error amplifier 141. Between the drain of the PMOS transistor 142 and the SINN terminal, the resistors 143 and 144 are connected in series. A node N14 to which the resistors 143 and 144 are connected, is connected to the other non-inverting input terminal (+) of the error amplifier 141. A node to which the drain of the PMOS transistor 142 and the resistor 143 are connected is connected to the VDRV5 terminal (an internal reference voltage terminal) (see FIG. 3). The OCP circuit 145 senses a current flowing through the source of the PMOS transistor 142 and outputs an OCP output voltage according to the sensed current.

In normal operation, where the OCP circuit 145 does not detect an overcurrent, the gate of the PMOS transistor 142 is driven by the error amplifier 141 such that the voltage at the node N14 remains equal to the reference voltage Vref from the band gap 12. That is, in normal operation, feedback control is performed based on the voltage at the node N14. As a result, an internal reference voltage Vdrv5 of 5.0 V is generated at the VDRV5 terminal relative to the negative reference voltage Vsinn. On the other hand, as the output current of the VDRV5 terminal increases, the OCP output voltage rises, and when the OCP output voltage exceeds the reference voltage Vref (overcurrent condition), feedback control is switched to keep the OCP output voltage equal to the reference voltage Vref.

Between the VDRV5 terminal and the SINN terminal, an output capacitor Cvdrv5 is connected outside the LED driving device 10 (see FIG. 3).

3. MOS Transistor

Next, a configuration relating to the MOS transistor M1 provided in the LED driving device 10 will be described. As shown in FIG. 3, the LED driving device 10 has the MOS transistor M1. The MOS transistor M1 is configured as an N-channel MOSFET.

The drain of the MOS transistor M1 is connected to the GNDIN terminal (a second terminal). The GNDIN terminal is connected to an application terminal for the ground GND. The source of the MOS transistor M1 is connected to the SINN terminal. Thus, the MOS transistor M1 switches the GNDIN terminal and the SINN terminal between a state short-circuited to each other and a state cut off from each other.

As shown in FIG. 3, the LED driving device 10 has a UVLO (undervoltage lock-out) circuit 15, a DC/DC start-up state detection circuit 16, and a MOS control circuit 17.

In a UVLO state (undervoltage state) where the internal reference voltage Vdrv5 is equal to or lower than a UVLO cancellation voltage, the UVLO circuit 15 outputs a high-level UVLO signal Uv. On the other hand, in a UVLO-cancelled state where the internal reference voltage Vdrv5 is higher than the UVLO cancellation voltage, the UVLO circuit 15 outputs a low-level UVLO signal Uv.

In the UVLO-cancelled state, the DC/DC start-up state detection circuit 16 detects whether the DC/DC converter is before start-up or not and outputs a detection signal Det.

The MOS control circuit 17 feeds a gate signal GT1 to the gate of the MOS transistor M1 according to the levels of the UVLO signal Uv and the detection signal Det. The MOS transistor M1 is turned on and off by the gate signal GT1. The MOS control circuit 17 generates the gate signal GT1 for turning on the MOS transistor M1 based on the internal supply voltage Vp42.

4. Problem with the Comparative Examples

The present inventors have found out the following shortcoming of the LED driving device 10 described above: if it is configured such that the MOS transistor M1 is driven with the internal reference voltage Vdrv5 (comparative example), as will be described below, the internal reference voltage generating circuit 14 does not start up when the LED driving device starts up with the supply voltage Vpinp on.

Here, the PINN and SINN terminals are connected together via the heat dissipation pad and are at the same potential. Between the PINP terminal and the PINN terminal, an input capacitor Cpin2 is connected.

When the supply voltage Vpinp is turned on, the supply voltage Vpinp rises and, as shown in FIG. 3, start-up currents Is1 and Is2 appear transiently. The start-up current Is1 flows from the application terminal for the input supply voltage Vpinp via the input capacitor Cpin2, a parasitic diode in the low-side transistor LM, and the inductor L to the application terminal for the ground GND. The start-up current Is2 flows from the application terminal for the input supply voltage Vpinp via the input capacitor Cpin2, the SINN terminal, and a parasitic diode in the MOS transistor M1 to the application terminal for the ground GND.

As a result, the forward voltages (Vf) across the parasitic diodes in the low-side transistor LM and the MOS transistor M1 make the negative reference voltage Vsinn higher than the ground GND (the negative reference voltage Vsinn is in a floating state).

Here, the negative reference voltage Vsinn appears in a P-type substrate (P-Sub) included in a chip, and when the negative reference voltage Vsinn becomes a predetermined voltage (here, as one example, 0.3 V) higher than the ground GND, a parasitic NPN transistor Tr shown in FIG. 3 is turned on. Here, as shown in FIG. 4, the internal power circuit 11 uses the Zener diode 112 so as to be insusceptible to parasitic operation as mentioned above. Moreover, the negative reference voltage Vsinn is clamped at about GND+ 0.7 V, and thus a voltage of about Vpinp (input supply voltage) −0.7 V is fed between the PINP and SINN terminals; thus it is possible to secure a sufficient operation current. Thus, the internal power circuit 11 does not fail to start up. In this way, the internal power circuit 11 does not fail to start up and the internal power voltage Vp42 rises, so that the negative reference voltage Vsinn is clamped at about GND+0.7 V; thus, a voltage and a current sufficient for the circuit operation of the band gap reference 12 are secured and also the band gap reference 12 does not fail to start up.

Inconveniently, the parasitic NPN transistor Tr turning on as described above may bring the OCP circuit 145 shown in FIG. 5 into an overcurrent-detected state, leading to a fault in which that the internal reference voltage Vdrv5 does not start up. Thus, unless the internal reference voltage Vdrv5 starts up, the MOS transistor M1 cannot be turned on.

Even if the start-up currents Is1 and Is2 stop flowing, the circuits that operate based on the negative reference voltage Vsinn (i.e., the internal power circuit 11, the band gap reference 12, and the like) permit a circuit current to flow from the line of the negative reference voltage Vsinn to the ground GND via the parasitic diode in the MOS transistor M1. Thus, the negative reference voltage Vsinn is kept in a floating state. Accordingly, the parasitic NPN transistor Tr is kept on and the internal reference voltage Vdrv5 does not start up.

Figure 6:
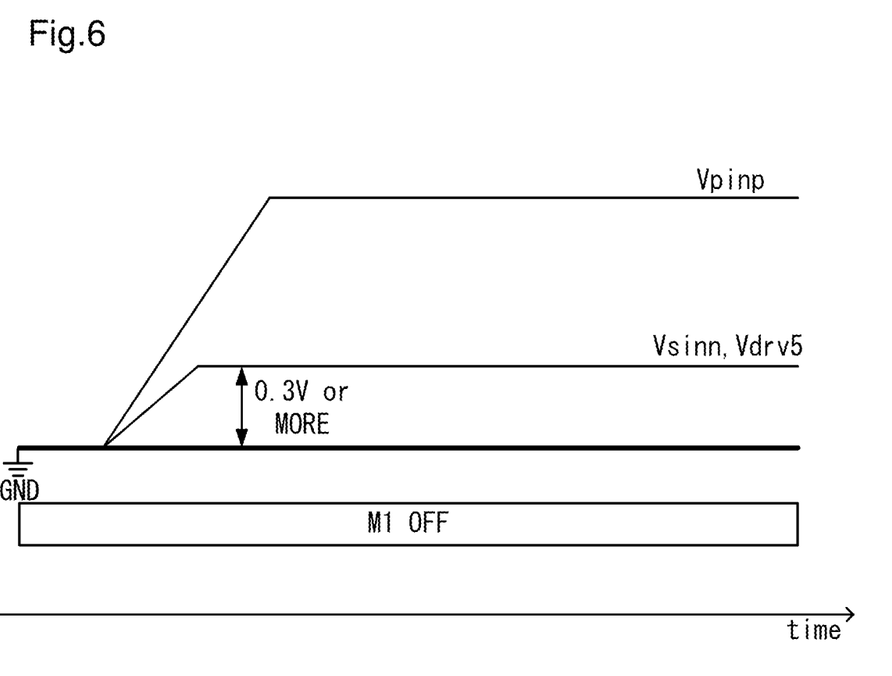
FIG. 6 is a timing chart showing an example of the operation, at start-up, of an LED driving device according to a comparative example.

FIG. 6 is a timing chart showing an example of the waveforms of the input supply voltage Vpinp, the negative reference voltage Vsinn, and the internal reference voltage Vdrv5 as observed with the input supply voltage Vpinp on, along with the state of the MOS transistor M1.

As shown in FIG. 6, the negative reference voltage Vsinn rises from the ground GND to and is then kept at a voltage that is a predetermined voltage higher than the ground GND. The internal reference voltage Vdrv5 does not start up, so it overlaps with the negative reference voltage Vsinn (that is, it remains at 0 V relative to the negative reference voltage Vsinn). The MOS transistor M1 is kept off.

5. Solution to the Problem

To solve the problem of the internal reference voltage Vdrv5 not starting up at the turning-on of the supply voltage Vpinp as described above, the configuration shown in FIG. 3 and described below, is adopted.

Figure 7:
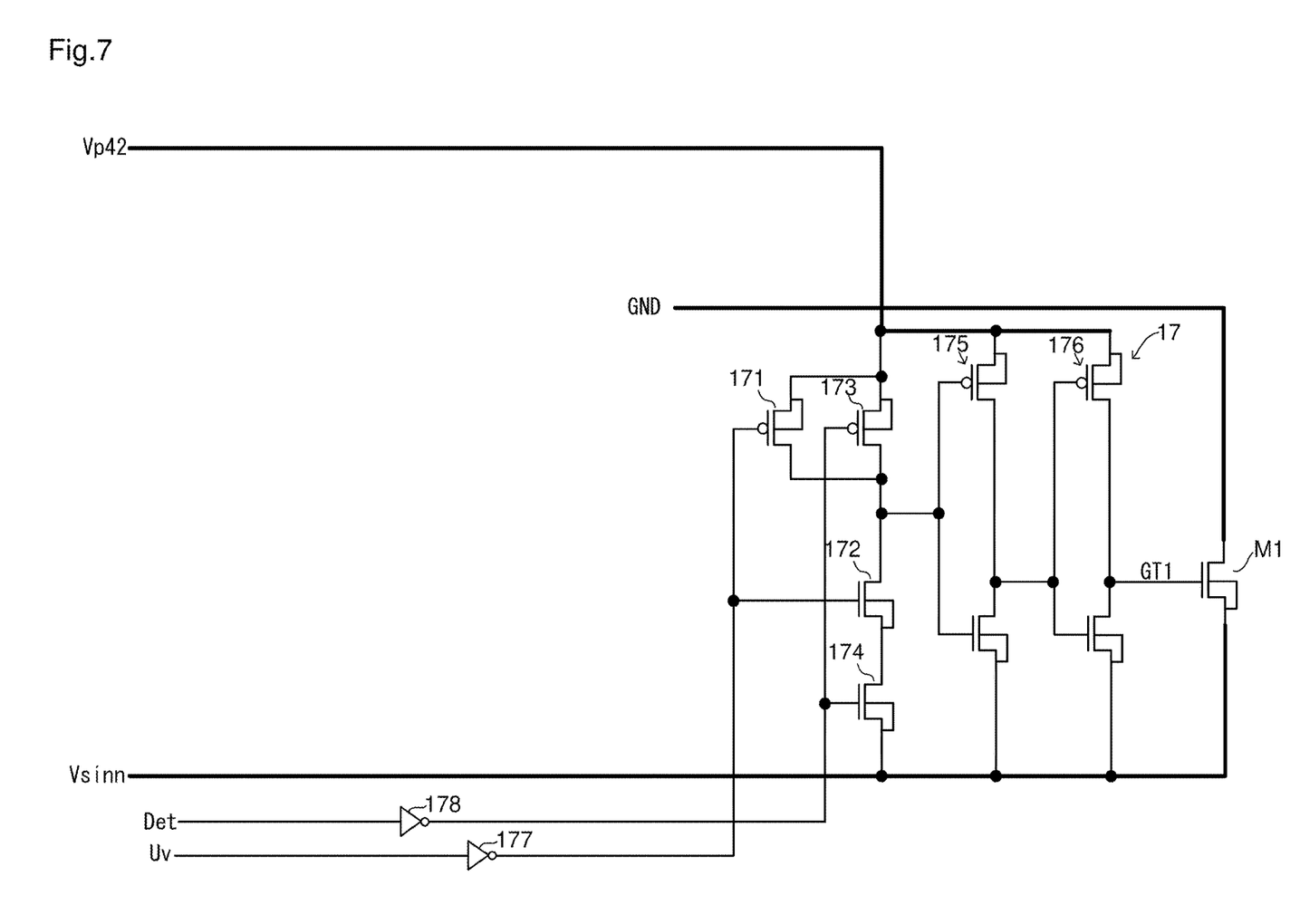
FIG. 7 is a circuit diagram showing a configuration example of a MOS controller.

Here, FIG. 7 is a circuit diagram showing a specific configuration example of a MOS controller 17.

As shown in FIG. 7, the MOS controller 17 includes a PMOS transistor 171, an NMOS transistor 172, a PMOS transistor 173, an NMOS transistor 174, inverters 175 and 176, and inverters 177 and 178.

The source of the PMOS transistor 171 is connected to an application terminal of the internal supply voltage Vp42. The drain of the PMOS transistor 171 is connected to the drain of the NMOS transistor 172. The source of the NMOS transistor 172 is connected to the drain of the NMOS transistor 174. The source of the NMOS transistor 174 is connected to an application terminal of the negative reference voltage Vsinn. The gates of the PMOS transistor 171 and the NMOS transistor 172 are fed with the UVLO signal Uv fed from the UVLO circuit 15 (see FIG. 3) via the inverter 177. The gates of the PMOS transistor 173 and the NMOS transistor 174 are fed with the detection signal Det fed from the DC/DC start-up state detection circuit 16 via the inverter 178.

The inverters 175 and 176 are each configured with a PMOS and an NMOS transistor that are connected in series across the application terminal of the internal supply voltage Vp42 and the application terminal of the negative reference voltage Vsinn. A node to which the drains of the PMOS transistor 173 and the NMOS transistor 172 are connected is connected to the input terminal of the inverter 175. The output terminal of the inverter 175 is connected to the input terminal of the inverter 176. The gate signal GT1 fed from the output terminal of the inverter 176 is fed to the gate of the MOS transistor M1.

When the UVLO signal Uv is at high level, indicating the UVLO state, the PMOS transistor 171 is on and the NMOS transistor 172 is off, so that high level is fed to the inverter 175; thus the gate signal GT1 is at high level and the MOS transistor M1 is on. By contrast, when the UVLO signal Uv is at low level, indicating the UVLO-cancelled state, the PMOS transistor 171 is off and the NMOS transistor 172 is on, so that the level fed to the inverter 175 is the level resulting from the level of the detection signal Det being inverted by the inverter 178 and then by the inverter composed of the PMOS transistor 173 and the NMOS transistor 174.

That is, in a UVLO-cancelled state, the gate signal GT1 is generated so as to have a level according to the level of the detection signal Det. More specifically, if the level of the detection signal Det is at high level, the gate signal GT1 is at high level and the MOS transistor M1 is on. By contrast, if the level of the detection signal Det is at low level, the gate signal GT1 is at low level and the MOS transistor M1 is off.

Figure 8:
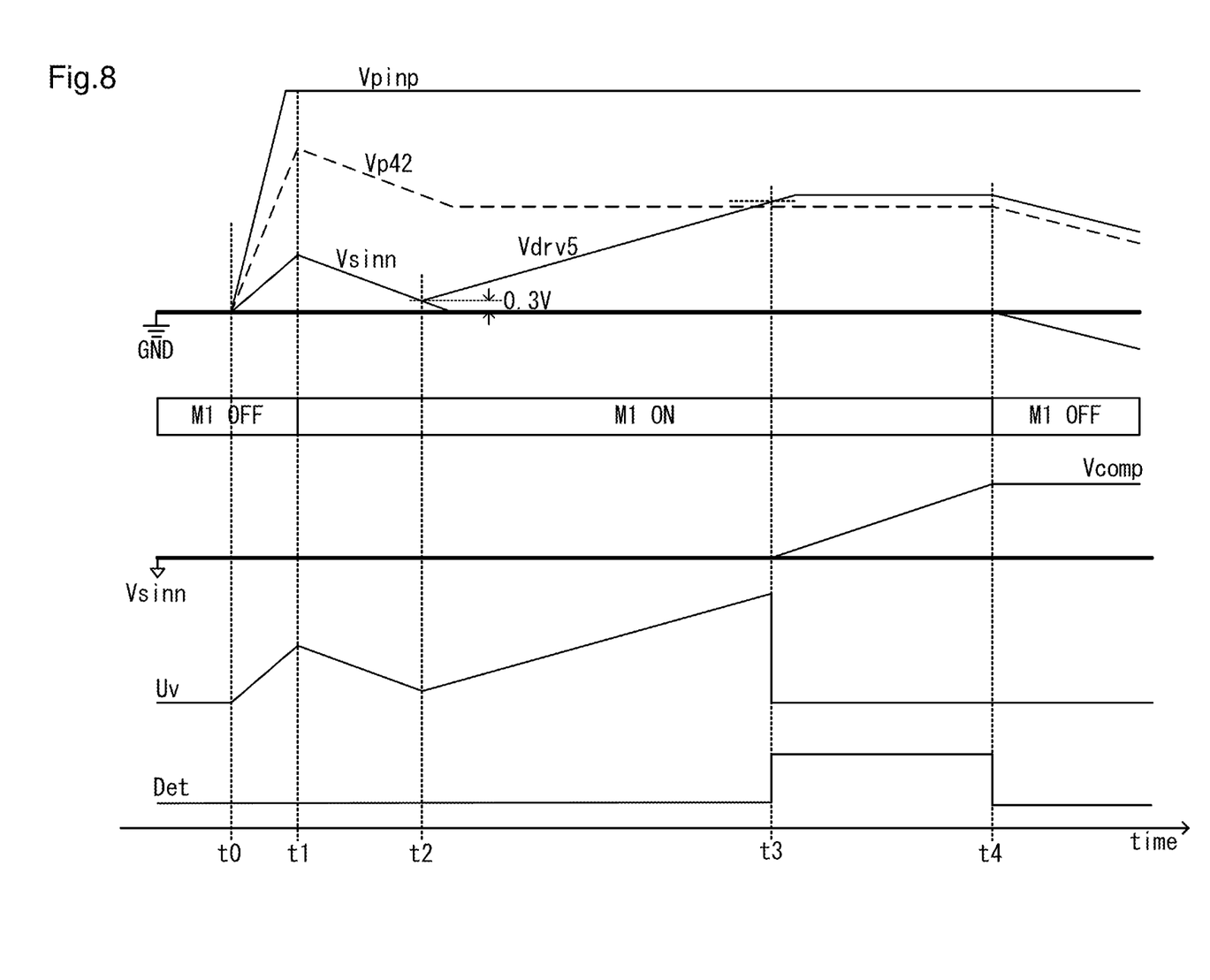
FIG. 8 is a timing chart showing an example of the operation, at start-up, of an LED driving device according to an embodiment of the present disclosure.

The start-up operation of the LED driving device 10 according to the embodiment configured as described above will now be described with reference to FIG. 8. FIG. 8 shows an example of the waveforms of relevant signals as observed when of the input supply voltage Vpinp is turned on. Specifically, FIG. 8 shows an example of the waveforms of the input supply voltage Vpinp, the internal supply voltage Vp42, the internal reference voltage Vdrv5, negative reference voltage Vsinn, and the voltage Vcomp at a COMP terminal. The COMP terminal is an external terminal (not illustrated in FIG. 1) to which the output of the error amplifier 2 (i.e., the error signal Err) is fed and is a phase compensation capacitance connection terminal. FIG. 8 also shows the operation state of the MOS transistor M1, the UVLO signal Uv, and the detection signal Det.

First, when the input supply voltage Vpinp is turned on at timing t0 shown in FIG. 8, the input supply voltage Vpinp starts to rise. At timing to, the MOS transistor M1 is off.

Then, the start-up currents Is1 and Is2 mentioned above with reference to FIG. 3 appear, and thus the negative reference voltage Vsinn rises. When the negative reference voltage Vsinn becomes a predetermined voltage (here, as one example, 0.3 V) higher than the ground GND, the parasitic NPN transistor Tr (see FIG. 3) is turned on as mentioned above. In this state, the internal reference voltage generating circuit 14 does not operate and the internal reference voltage Vdrv5 does not start up. Accordingly, in FIG. 8, the internal reference voltage Vdrv5 and the negative reference voltage Vsinn overlap.

By contrast, as the input supply voltage Vpinp rises, the internal power circuit 11 starts up and the internal supply voltage Vp42 rises to a predetermined voltage (here, as one example, 4.2 V) relative to the negative reference voltage Vsinn (timing t1). As mentioned above, the internal supply voltage Vp42 starts up regardless of the parasitic NPN transistor Tr is on or not. The band gap reference 12 also starts up regardless of the parasitic NPN transistor Tr is on or not.

The internal reference voltage Vdrv5 does not start up and the UVLO signal Uv is at high level, indicating the UVLO state, so, with the configuration in FIG. 7, the gate signal GT1 turns to high level and the MOS transistor M1 turns on (the high level of the UVLO signal is equal to the internal reference voltage Vdrv5). As a result, the GNDIN terminal and the SINN terminal are short-circuited together and the negative reference voltage Vsinn falls towards the ground GND.

When the negative reference voltage Vsinn reaches a voltage higher than the ground GND by a predetermined voltage (0.3 V), the parasitic NPN transistor Tr is turned off (timing t2). After that, the negative reference voltage Vsinn falls down to the ground GND. The parasitic NPN transistor Tr is turned off, and thus the internal reference voltage generating circuit 14 starts to operate and the internal reference voltage Vdrv5 starts to rise relative to the negative reference voltage Vsinn. That is, the internal reference voltage Vdrv5 starts up.

Then, when the internal reference voltage Vdrv5 exceeds a predetermined UVLO cancellation voltage (timing t3), the UVLO signal Uv (FIG. 3) turns to low level. At this time, though in the UVLO cancellation state, the DC/DC converter is in a state before start-up, and thus the DC/DC start-up state detection circuit 16 (FIG. 3) outputs a high-level detection signal Det indicating that it is before start-up. As a result, with the configuration in FIG. 7, the gate signal GT1 turns to high level and the MOS transistor M1 is kept on.

In this way, the MOS transistor M1 is kept on, so the negative reference voltage Vsinn is kept at the ground GND. As a result of UVLO cancellation, the error amplifier 2 starts up and the COMP terminal voltage Vcomp starts to rise.

When the COMP terminal Vcomp reaches the slope of the slope signal Slp, switching with the high- and low-side transistors HM and LM starts and the DC/DC converter starts up (timing t4). Thus, the negative reference voltage Vsinn falls beyond the ground GND and becomes negative.

Moreover, at that time, the detection signal Det turns to low level, indicating start-up, and thus the gate signal GT1 turns to low level and the MOS transistor M1 turns off.

Thus, in the embodiment, when the input supply voltage Vpinp is turned on, the MOS transistor M1 is forced to turn on by using the internal supply voltage Vp42 generated by the internal power circuit 11; it is thus possible to release the negative reference voltage Vsinn from the floating state and start up the internal reference voltage Vdrv5.

6. Other Modifications

The various technical features disclosed herein can be modified in various ways without departure from the spirit of the technical ingenuity. It should be understood that the above-described embodiment is in every aspect illustrative and not restrictive. The technical scope of the present disclosure is defined not by the description of the embodiment given above but by the appended claims, and encompasses any modifications made without departure from the scope and sense equivalent to those claims.

For example, in the embodiment described above, the common voltage (the voltage at the SINN terminal) is negative; this, however, is not meant as any limitation: the present disclosure can be applied to various configurations in which the input-side GND (the voltage at the GNDIN terminal) differs in type from the output-side common voltage.

7. Notes

As described above, a power control device (10) according to one aspect of the present disclosure is configured to control a power circuit that generates an output voltage (Vout) based on an input supply voltage (Vpinp) relative to a ground, and includes a first terminal (SINN) fed with a common voltage (Vsinn), a second terminal (GNDIN) connectable to an application terminal for the ground, a P-type substrate fed with the common voltage, a MOS transistor (M1) connected between the first and second terminals and configured with an N-channel MOSFET, and an internal reference voltage generating circuit (14) configured to generate, based on the input supply voltage, an internal reference voltage (Vdrv5) relative to the common voltage. When the input supply voltage is turned on, the MOS transistor is turned on and thereby the first and second terminals are short-circuited together. (A first configuration.)

In the first configuration described above, there may be further provided an internal power circuit (11) configured to generate, based on the input supply voltage (Vpinp), an internal supply voltage (Vp42) relative to the common voltage (Vsinn). When the input supply voltage is turned on, the MOS transistor may be turned on based on the internal supply voltage and thereby the first and second terminals (SINN, GNDIN) may be short-circuited together. (A second configuration.)

In the second configuration described above, the internal power circuit (11) may include a Zener diode (112) having the anode connected to the first terminal (SINN), a constant-current source (111) provided between an application terminal for the input supply voltage (Vpinp) and the cathode of the Zener diode, an NMOS transistor (113) having the gate connected to the cathode of the Zener diode, a resistor (114) connected between the application terminal for the input supply voltage and the drain of the NMOS transistor, and a capacitor (115) connected between the source of the NMOS transistor and the anode of the Zener diode. (A third configuration.)

In the second or third configuration described above, there may be further provided a UVLO circuit (15) configured to detect a UVLO state or a UVLO-cancelled state of the internal reference voltage (Vdrv5), and a MOS control circuit (17) configured to apply, based on a UVLO signal (Uv) indicating the UVLO state fed from the UVLO circuit, a high-level gate signal (GT1) based on the internal supply voltage (Vp42) to the gate of the MOS transistor (M1). (A fourth configuration.)

In the fourth configuration described above, there may be further provided a start-up state detection circuit (16) configured to detect a start-up state of the power circuit in the UVLO cancelled-state. Depending on the detection result of the start-up state by the start-up state detection circuit, the MOS control circuit (17) may feed the gate signal (GT1) to the gate of the MOS transistor (M1). (A fifth configuration.)

In any one of the second to fifth configuration described above, there may be further provided a band gap reference (12) configured to generate a reference voltage (Vref) based on the internal supply voltage (Vp42). The internal reference voltage generating circuit (14) may include an error amplifier (141), a PMOS transistor (142) having the gate connected to the output terminal of the error amplifier and having the source connected to the application terminal for the input supply voltage (Vpinp), resistors (143, 144) connected in series between the drain of the PMOS transistor and the first terminal (SINN), and an OCP circuit (145) configured to detect an overcurrent flowing through the source of the PMOS transistor. The reference voltage may be fed to a first input terminal of the error amplifier. An overcurrent detection signal from the OCP circuit may be fed to a second input terminal of the error amplifier. The node (N14) at which the resistors are connected together may be connected to a third input terminal of the error amplifier. (A sixth configuration.)

In any one of the first to sixth configuration described above, an LED driving device used in a DC/DC converter may include a high-side transistor (HM) connected to the application terminal for the input supply voltage (Vpinp), a low-side transistor (LM) connected in series with the high-side transistor, an inductor (L) of which one terminal is connected to the node at which the high- and low-side transistors are connected together and of which the other terminal is connected to the application terminal for the ground and to the anode of an LED (30), an output capacitor (Cout) connected between the other terminal of the inductor and to the other terminal of a sense resistor (Rsns) of which one terminal is connected to the cathode of the LED, and an input capacitor (Cpin2) connected between the application terminal for the input supply voltage and the other terminal of the sense resistor. The LED driving device may be configured to control switching of the high- and low-side transistors based on a sense voltage (Vsns) appearing across the sense resistor. The first terminal (SINN) may be connectable to the other terminal of the sense resistor. (A seventh configuration.)

According to another aspect of the present disclosure, a DC/DC converter may include the power control device (10) of the seventh configuration described above, the high- and low-side transistors (HM, LM), the inductor (L), and the output and input capacitors (Cout, Cpin2).

INDUSTRIAL APPLICABILITY

The present disclosure finds applications in, for example, the driving of LEDs incorporated in various devices.

REFERENCE SIGNS LIST 1 amplifier
2 error amplifier
3 oscillator
4 slope generator
5 comparator
6 flip-flop
7 high-side driver
8 low-side driver
9 diode
10 LED driving device
11 internal power circuit
12 band gap reference
13 TSD circuit
14 internal reference voltage generating circuit
15 UVLO circuit
16 DC/DC start-up state detection circuit
17 MOS controller
30 LED
171 PMOS transistor
172 NMOS transistor
173 PMOS transistor
174 NMOS transistor
175, 176 inverter
177, 178 inverter
Cboot boot capacitor
Cout output capacitor
Cpin2 input capacitor
Cvdrv5 output capacitor
HM high-side transistor
L inductor LM low-side transistor
M1 MOS transistor
Rsns sense resistor
Tr parasitic NPN transistor

The invention claimed is:

1. A power control device configured to control a power circuit that generates an output voltage based on an input supply voltage relative to a ground, comprising:
    a first terminal fed with a common voltage;
    a second terminal connectable to an application terminal for the ground;
    a P-type substrate fed with the common voltage;
    a MOS transistor connected between the first and second terminals and configured with an N-channel MOSFET; and
    an internal reference voltage generating circuit configured to generate, based on the input supply voltage, an internal reference voltage relative to the common voltage,
    wherein
    when the input supply voltage is turned on, the MOS transistor is turned on and thereby the first and second terminals are short-circuited together.

2. The power control device according to claim 1, further comprising:
    an internal power circuit configured to generate, based on the input supply voltage, an internal supply voltage relative to the common voltage,
    wherein
    when the input supply voltage is turned on, the MOS transistor is turned on based on the internal supply voltage and thereby the first and second terminals are short-circuited together.

3. The power control device according to claim 2, wherein the internal power circuit includes:
    a Zener diode having an anode connected to the first terminal;
    a constant-current source provided between an application terminal for the input supply voltage and a cathode of the Zener diode;
    an NMOS transistor having a gate connected to the cathode of the Zener diode;
    a resistor connected between the application terminal for the input supply voltage and a drain of the NMOS transistor; and
    a capacitor connected between a source of the NMOS transistor and the anode of the Zener diode.

4. The power control device according to claim 2, further comprising:
    a UVLO circuit configured to detect a UVLO state or a UVLO-cancelled state of the internal reference voltage; and
    a MOS control circuit configured to apply, based on a UVLO signal indicating the UVLO state fed from the UVLO circuit, a high-level gate signal based on the internal supply voltage to a gate of the MOS transistor.

5. The power control device according to claim 4, further comprising:
    a start-up state detection circuit configured to detect a start-up state of the power circuit in the UVLO cancelled-state,
    wherein
    depending on a detection result of the start-up state by the start-up state detection circuit, the MOS control circuit feeds the gate signal to the gate of the MOS transistor.

6. The power control device according to claim 2, further comprising:
    a band gap reference configured to generate a reference voltage based on the internal supply voltage,
    wherein
    the internal reference voltage generating circuit includes:
        an error amplifier;
        a PMOS transistor having
            a gate connected to an output terminal of the error amplifier and
            a source connected to the application terminal for the input supply voltage;
        resistors connected in series between a drain of the PMOS transistor and the first terminal; and
        an OCP circuit configured to detect an overcurrent flowing through the source of the PMOS transistor,
    the reference voltage is fed to a first input terminal of the error amplifier,
    an overcurrent detection signal from the OCP circuit is fed to a second input terminal of the error amplifier, and
    a node at which the resistors are connected together is connected to a third input terminal of the error amplifier.

7. The power control device according to claim 1 which is an LED driving device used in a DC/DC converter comprising:
    a high-side transistor connected to the application terminal for the input supply voltage;
    a low-side transistor connected in series with the high-side transistor;
    an inductor of which one terminal is connected to a node at which the high- and low-side transistors are connected together and of which another terminal is connected to the application terminal for the ground and to an anode of an LED;
    an output capacitor connected between the other terminal of the inductor and to another terminal of a sense resistor of which one terminal is connected to a cathode of the LED; and
    an input capacitor connected between the application terminal for the input supply voltage and the other terminal of the sense resistor,
    the LED driving device being configured to control switching of the high- and low-side transistors based on a sense voltage appearing across the sense resistor,
    wherein
    the first terminal is connectable to the other terminal of the sense resistor.

8. A DC/DC converter comprising:
    the power control device according to claim 7;
    the high- and low-side transistors;
    the inductor; and
    the output and input capacitors.

* * * * *